US012543132B2

(12) United States Patent
Alizadeh et al.

(10) Patent No.: US 12,543,132 B2
(45) Date of Patent: *Feb. 3, 2026

(54) COORDINATED ORTHOGONAL FREQUENCY DIVISION MULTIPLE ACCESS (C-OFDMA) IN HIGH DENSITY NETWORKS

(71) Applicant: Cisco Technology, Inc., San Jose, CA (US)

(72) Inventors: Ardalan Alizadeh, Milpitas, CA (US); John Matthew Swartz, Lithia, FL (US); Sivadeep Reddy Kalavakuru, Akron, OH (US); Matthew Aaron Silverman, Shaker Heights, OH (US)

(73) Assignee: Cisco Technology, Inc.

( * ) Notice: Subject to any disclaimer, the term of this patent is extended or adjusted under 35 U.S.C. 154(b) by 643 days.

This patent is subject to a terminal disclaimer.

(21) Appl. No.: 17/813,216

(22) Filed: Jul. 18, 2022

(65) Prior Publication Data

US 2024/0023040 A1 Jan. 18, 2024

(51) Int. Cl.
*H04W 56/00* (2009.01)
*H04L 5/00* (2006.01)
*H04W 88/08* (2009.01)

(52) U.S. Cl.
CPC ....... *H04W 56/0015* (2013.01); *H04L 5/0007* (2013.01); *H04L 5/0035* (2013.01); *H04W 88/08* (2013.01)

(58) Field of Classification Search
CPC . H04W 56/0015; H04W 88/08; H04W 84/12; H04L 5/0007; H04L 5/0035; H04B 7/0617
See application file for complete search history.

(56) References Cited

U.S. PATENT DOCUMENTS

| | | |
|---|---|---|
| 11,265,857 B1 | 3/2022 | Alizadeh et al. |
| 2020/0305103 A1 | 9/2020 | Chen et al. |
| 2021/0051722 A1 | 2/2021 | Huang et al. |
| 2021/0119677 A1* | 4/2021 | Zhang ............... H04W 74/0816 |
| 2021/0385779 A1 | 12/2021 | Oteri et al. |

FOREIGN PATENT DOCUMENTS

| | | | |
|---|---|---|---|
| KR | 101238325 B1 | 3/2013 | |
| WO | WO-2021076413 A1 * | 4/2021 | ........... H04B 17/318 |

* cited by examiner

*Primary Examiner* — Justin T Van Roie
(74) *Attorney, Agent, or Firm* — Merchant & Gould P.C.

(57) ABSTRACT

Coordinated Orthogonal Frequency Division Multiple Access (C-OFDMA) in high density networks may be provided. A primary Access Point (AP) and a subordinate AP may be caused to use an omnidirectional antenna pattern during a synchronization period. Next, the primary AP and the subordinate AP may be caused to use an omnidirectional antenna pattern during a time in which the primary AP sends a subordinate Trigger Frame (TF) during a first C-OFDMA period. The primary AP and the subordinate AP may then be caused to use a directional antenna pattern during times in which the primary AP and the subordinate AP Uplink (UL) data during the first C-OFDMA period and Downlink (DL) data during the first C-OFDMA period.

20 Claims, 5 Drawing Sheets

COORDINATED ORTHOGONAL FREQUENCY DIVISION MULTIPLE ACCESS (C-OFDMA) IN HIGH DENSITY NETWORKS

TECHNICAL FIELD

The present disclosure relates generally to Coordinated Orthogonal Frequency Division Multiple Access (C-OFDMA) in high density networks.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
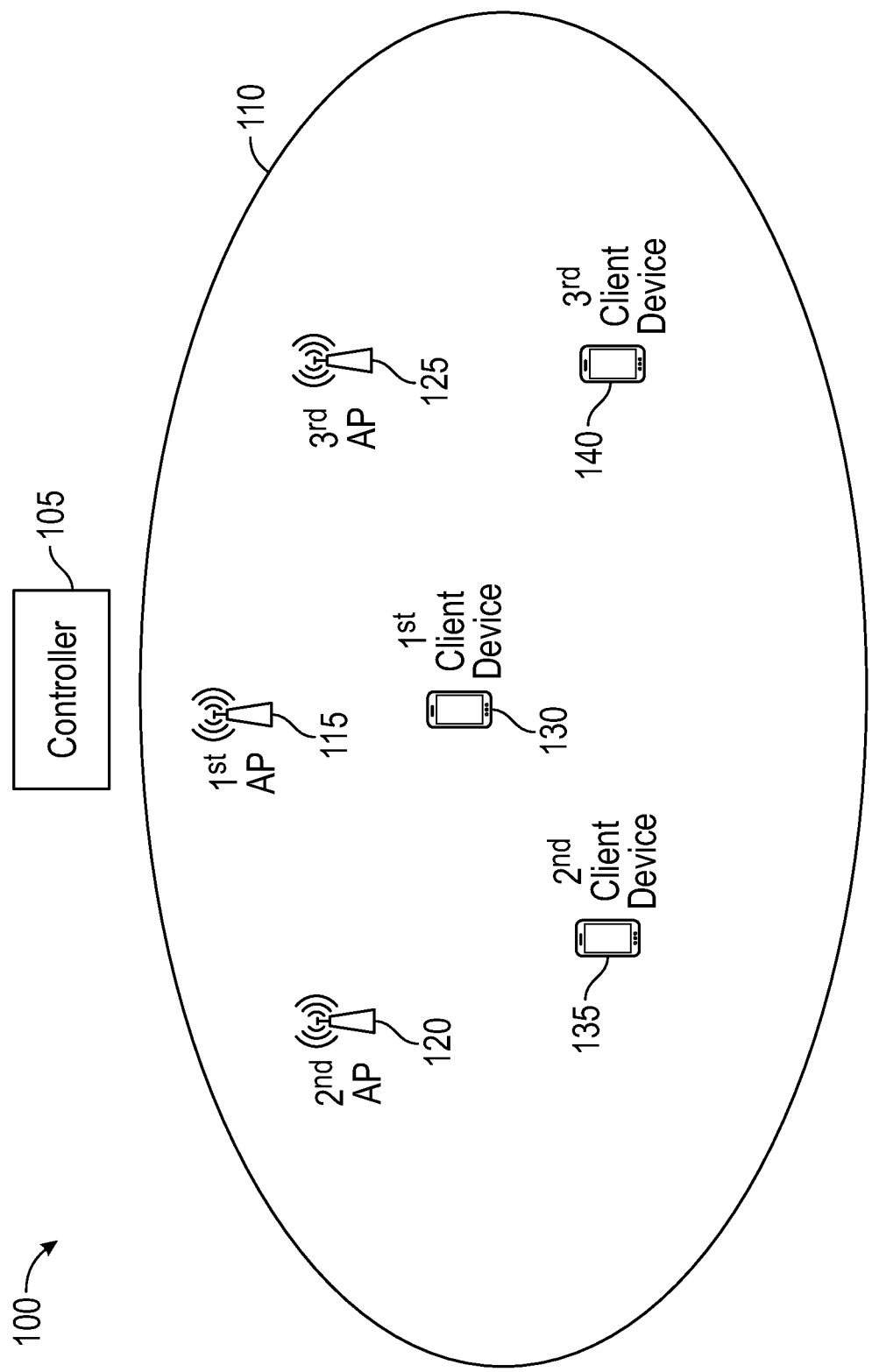
FIG. 1 is a block diagram of an operating environment for providing Coordinated Orthogonal Frequency Division Multiple Access (C-OFDMA) in high density networks.

Coordinated Orthogonal Frequency Division Multiple Access (C-OFDMA) in high density networks may be provided. A primary Access Point (AP) and a subordinate AP may be caused to use an omnidirectional antenna pattern during a synchronization period. Next, the primary AP and the subordinate AP may be caused to use an omnidirectional antenna pattern during a time in which the primary AP sends a subordinate Trigger Frame (TF) during a first C-OFDMA period. The primary AP and the subordinate AP may then be caused to use a directional antenna pattern during times in which the primary AP and the subordinate AP Uplink (UL) data during the first C-OFDMA period and Downlink (DL) data during the first C-OFDMA period.

Both the foregoing overview and the following example embodiments are examples and explanatory only and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

High density Wireless Local Area Networks (WLANs) such as in stadiums may face significant challenges due to the high number of APs in closed proximity. This may result in a significant increase of channel contention and interference level for co-channel APs due to the limited number of non-overlapping channels, the unplanned selection of primary channels and channel widths, and the unplanned deployment of APs with factory default parameters. However, the need for low-latency network coverage in such dense environments has been growing because of the usage of devices such as Virtual Reality (VR)/Augmented Reality (AR) devices in live events.

Coordinated Orthogonal Frequency Division Multiple Access (C-OFDMA) may comprise a scheme among the various Multi-AP coordination schemes for Wi-Fi (i.e., Institute of Electrical and Electronics Engineers (IEEE) 802.11 be). In C-OFDMA, collaborative APs may synchronize their data transmissions and use orthogonal time/frequency resources. This coordinated resource assignment may diminish the collision probability with respect to the case when APs implement independent contention-based channel access procedures.

C-OFDMA may be attractive to minimize the latency of short packet data transmission. This is because it may allow an efficient sharing and full occupation of the band by collaborating neighboring nodes, which otherwise may require multiple contention processes, and may not utilize the available resources up to their potential.

To efficiently support such dense environment, directional antennas may be taken advantage of in order to provide smaller (e.g., micro) cell sizes. However, this deployment may not allow inter-AP communications because of low antenna gain in the horizontal direction. Accordingly, it may be difficult to leverage C-OFDMA in dense network and use its capacity to reduce the overhead of channel use. Consequently, embodiments of the disclosure may provide processes to enable C-OFDMA in dense networks with directional antennas.

FIG. 1 shows an operating environment 100 for providing C-OFDMA in high density networks. As shown in FIG. 1, operating environment 100 may comprise a controller 105 and a coverage environment 110. Coverage environment 110 may comprise, but is not limited to, a Wireless Local Area Network (WLAN) comprising a plurality of Access Points (APs) that may provide wireless network access (e.g., access to the WLAN for client devices). The plurality of APs may comprise a first AP 115, a second AP 120, a third AP 125. The plurality of APs may provide wireless network access to a plurality of client devices as they move within coverage environment 110. The plurality of client devices may comprise, but are not limited to, a first client device 130, a second client device 135, and a third client device 140. Ones of the plurality of client devices may comprise, but are not limited to, a smart phone, a personal computer, a tablet device, a mobile device, a telephone, a remote control device, a set-top box, a digital video recorder, an Internet-of-Things (IoT) device, a network computer, a router, Virtual Reality (VR)/Augmented Reality (AR) devices, or other similar microcomputer-based device. Each of the plurality of APs may be compatible with specification standards such as, but not limited to, the Institute of Electrical and Electronics Engineers (IEEE) 802.11ax specification standard for example.

Controller 105 may comprise a Wireless Local Area Network controller (WLC) and may provision and control coverage environment 110 (e.g., a WLAN). Controller 105 may allow first client device 130, second client device 135, and third client device 140 to join coverage environment 110. In some embodiments of the disclosure, controller 105 may be implemented by a Digital Network Architecture Center (DNAC) controller (i.e., a Software-Defined Network (SDN) controller) that may configure information for coverage environment 110 in order to provide C-OFDMA in high density networks.

First AP 115, second AP 120, third AP 125, first client device 130, second client device 135, or third client device 140 may use either an omnidirectional antenna pattern or a directional antenna pattern. When using an omnidirectional antenna pattern, the client devices or APs may have the capable of transmitting and receiving signals in all horizontal directions. In contrast, when the client devices or APs use a directional antenna pattern it may focus a signal's energy in one direction. As a result, a directional antenna pattern may have a higher antenna gain in one direction as compared with its omnidirectional counterpart.

The IEEE 802.11ax specification standard, for example, may support OFDMA technology to provide media access to the client devices. With OFDMA, the media may be divided into time slots along a time axis and may have a channel width along a frequency axis. When using OFDMA to provide media access, an AP may partition a channel into smaller sub-channels know as Transmit Opportunities (TxOPs) (i.e., Resource Units (RUs)) so that simultaneous multiple-user transmissions may occur. The channel width may comprise, for example, 16 MHz broken into eight, 2 MHz RUs. An AP may determine RU allocation for multiple stations (i.e., client devices) for both Downlink (DL) and Uplink (UL) OFDMA. In other words, an AP may determine how RUs may be assigned to stations (i.e., first client device 130, second client device 135, or third client device 140) within a given channel. The stations may provide feedback to IEEE 802.11ax compatible APs using, for example, solicited or unsolicited Buffer Status Reports (BSRs), however, the AP may make the decision in regards to RU allocation for synchronized UL OFDMA from multiple client devices.

The elements described above of operating environment 100 (e.g., controller 105, first AP 115, second AP 120, third AP 125, first client device 130, second client device 135, or third client device 140) may be practiced in hardware and/or in software (including firmware, resident software, microcode, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 5, the elements of operating environment 100 may be practiced in a computing device 500.

Figure 2:
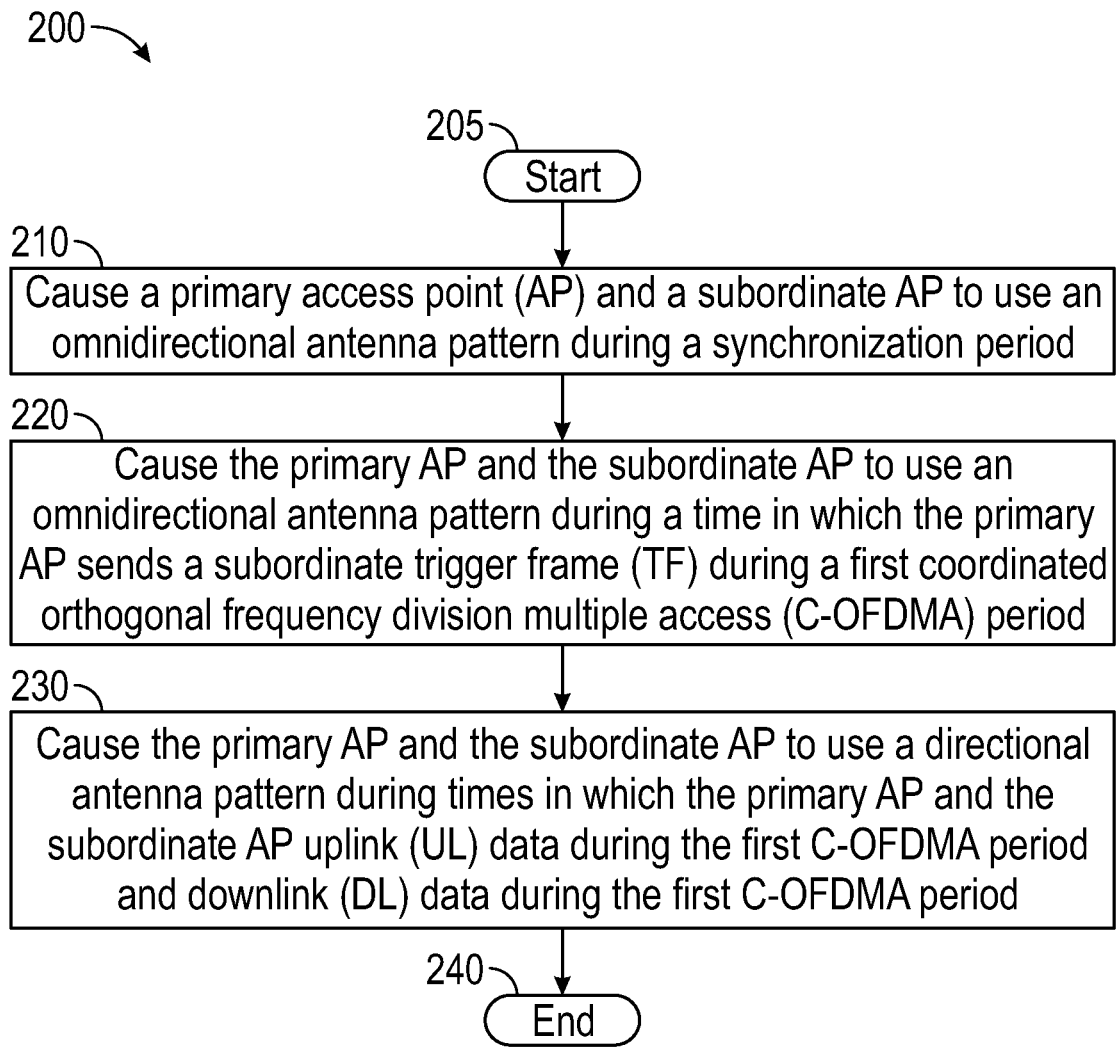
FIG. 2 is a flow chart of a method for providing C-OFDMA in high density networks.

FIG. 2 is a flow chart setting forth the general stages involved in a method 200 consistent with embodiments of the disclosure for providing C-OFDMA in high density networks. Method 200 may be implemented using controller 105 as described in more detail above with respect to FIG. 1. Ways to implement the stages of method 200 will be described in greater detail below.

The IEEE 802.11be task group has allowed for a set of APs to form a multi-AP system that may have a distributed or centralized coordination. In the latter case, a central AP may be considered a primary AP, while the remaining APs may be considered subordinate APs. With reference to FIG. 1, first AP 115 may comprise the primary AP while second AP 120 and third AP 125 may comprise subordinate APs.

Figures 3A, 3B:
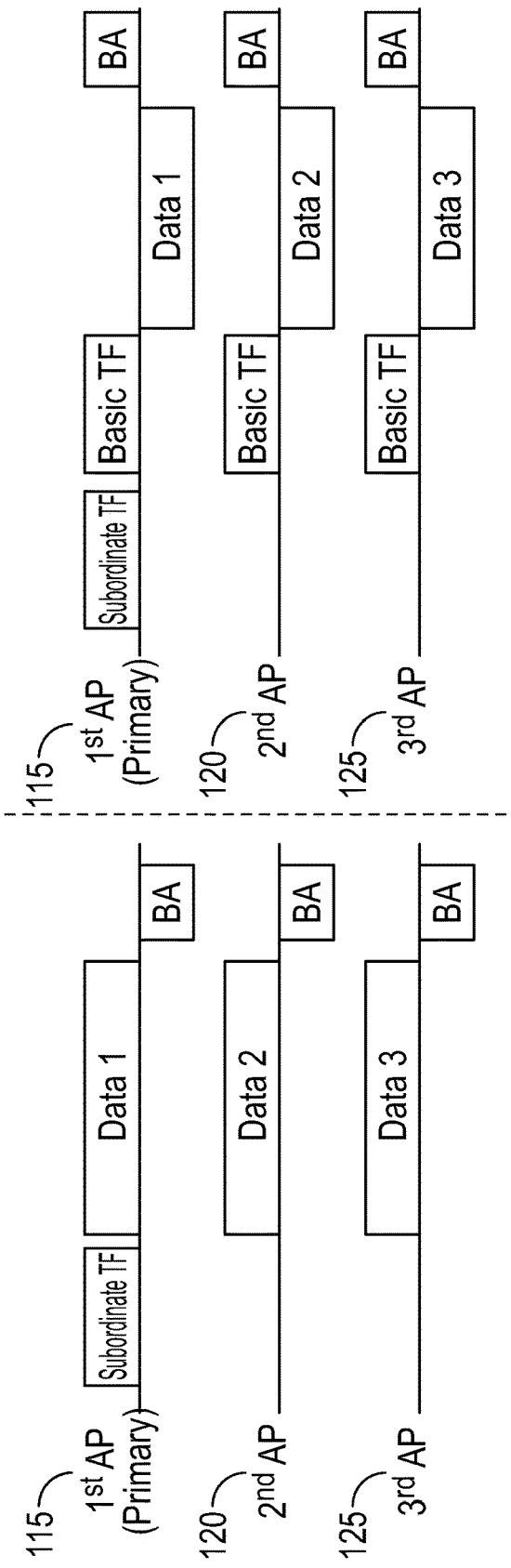
FIGS. 3A and 3B illustrate a C-OFDMA Downlink (DL) and Uplink (UL) procedure.

C-OFDMA may comprise one of the multi-AP coordination processes. With C-OFDMA, the nearby APs may: i) assign the same RUs for some stations (i.e., client devices) if such transmission does not interfere; or ii) may assign different RUs to avoid interference. The primary AP may send a Trigger Frame (TF) to the subordinate APs with the information about the RUs that may be used. All APs may send the data at the same time (e.g., for DL as illustrated by FIG. 3A) or a basic TF (e.g., for UL as illustrated by FIG. 3B). The receiving client devices may send a Block Acknowledge (BA) to the AP as shown in FIG. 3A and the receiving AP may send a BA as shown in FIG. 3B.

Figure 4:
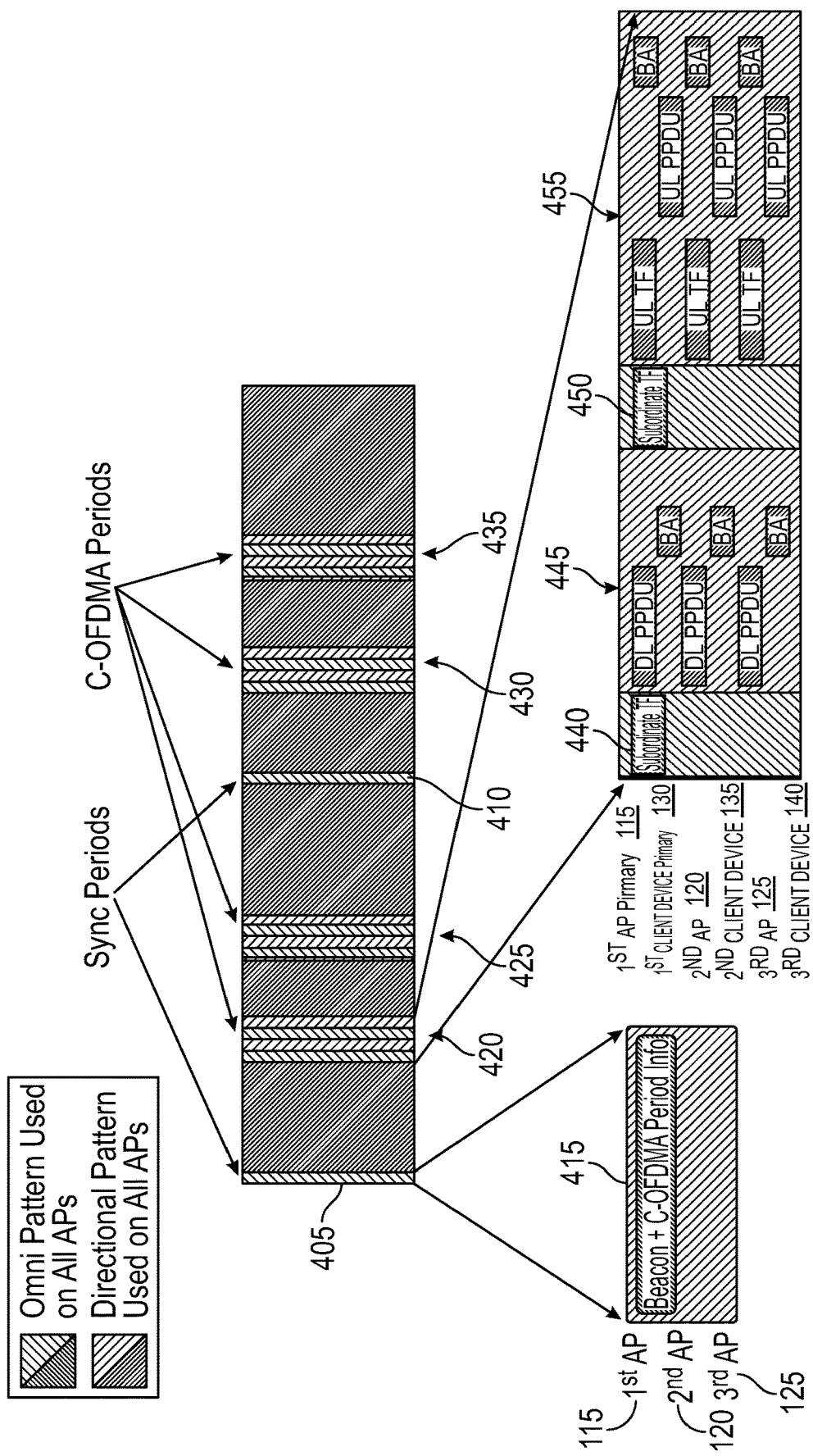
FIG. 4 illustrates using a omnidirectional and a directional antenna in C-OFDMA.

Method 200 may begin at starting block 205 and proceed to stage 210 where controller 105 may cause a primary AP (e.g., first AP 115) and a subordinate AP (e.g., second AP 120 or third AP 125) to use an omnidirectional antenna pattern during a synchronization period. For example, FIG. 4 illustrates data communication in coverage environment 110. As shown in FIG. 4, there may be a first synchronization period 405 and a second synchronization period 410. The subordinate AP and the primary AP may use an omnidirectional antenna pattern when the primary AP sends a beacon 415 (or a beacon-like frame) during first synchronization period 405.

Beacon 415 sent by the primary AP may contain Timing Synchronization Function (TSF) information for clock synchronization for the subordinate APs. This may allow for the subordinate APs to synchronize to the primary AP's clock. In addition, beacon 415 sent by the primary AP may include information about upcoming C-OFDMA periods. In other words, beacon 415 may communicates planned C-OFDMA periods for this synchronization period to the subordinate APs. For example, beacon 415 may be associated with first synchronization period 405 and may contain and communicate information about a first C-OFDMA period 420 and a second C-OFDMA period 425. A beacon associated with second synchronization period 410 may contain and communicate information about a third C-OFDMA period 430 and a fourth C-OFDMA period 435. The information about the C-OFDMA periods may comprise, but is not limited to, when the C-OFDMA periods may occur and for how long, how many C-OFDMA periods in a row, and which are UL and which are DL. If other inter-AP communication is desired, it may be done during the omnidirectional antenna pattern mode. This may be used for sharing the subordinate APs Buffer Status Reports (BSRs) and Bandwidth Query Reports (BQRs) for example.

From stage 210, where controller 105 causes the primary AP and the subordinate AP to use the omnidirectional antenna pattern during the synchronization period (e.g., first synchronization period 405), method 200 may advance to stage 220 where controller 105 may cause the primary AP and the subordinate AP to use the omnidirectional antenna pattern during a time in which the primary AP sends a first subordinate Trigger Frame (TF) 440 during first C-OFDMA period 420. For example, scheduled in first synchronization period 405 by the primary AP, first C-OFDMA period 420 may start with first subordinate TF 440 from the primary AP with all APs in coverage environment 110 in the omnidirectional antenna pattern mode.

Once controller 105 causes the primary AP and the subordinate AP to use the omnidirectional antenna pattern during a time in which the primary AP sends the first subordinate TF 440 during first C-OFDMA period 420 in stage 220, method 200 may continue to stage 230 where controller 105 may cause the primary AP and the subordinate AP to use a directional antenna pattern during times in which the primary AP and the subordinate AP UL data during the first C-OFDMA period 420 and DL data during the first C-OFDMA period 420. For example, all APs in coverage environment 110 may send data at the same time. During a DL period 445, the directional antenna pattern may be used when the APs sends DL Physical-Layer Protocol Data Units (PPDUs) to their respective client devices and the respective receiving client devices may send BAs back.

Next, all APs in coverage environment 110 may switch back to the omnidirectional antenna pattern when the primary AP sends a second subordinate TF 450. Then during an UL period 455, the directional antenna pattern may be used by all APs in coverage environment 110 when the APs send UL TFs to each of their respective receiving client devices and while the respective client devices send UL PPDUs to their respective APs. The respective receiving APs may send BAs back to the client devices during UL period 455 with all APs in the directional antenna pattern mode. Once controller 105 causes the primary AP and the subordinate AP to use the directional antenna pattern during times in which the primary AP and the subordinate AP UL data during first C-OFDMA period 420 and DL data during first C-OFDMA period 420 in stage 230, method 200 may then end at stage 240.

Figure 5:
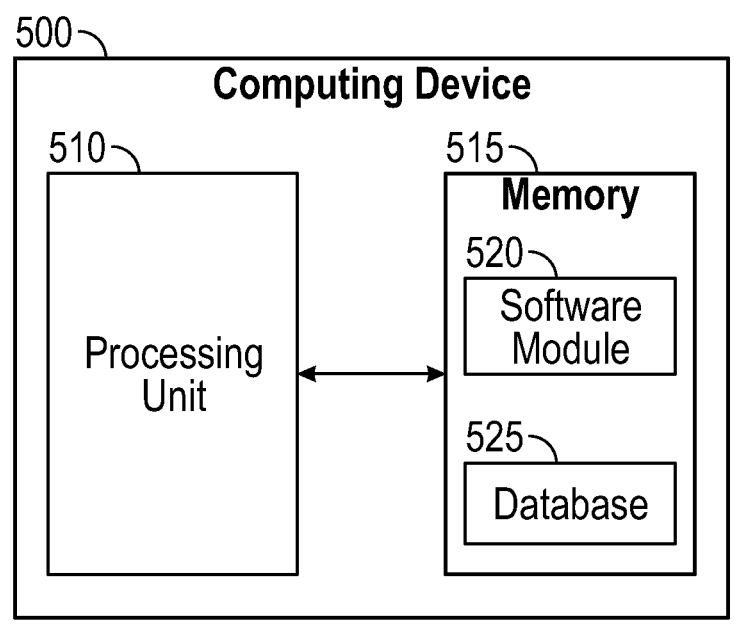
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for providing C-OFDMA in high density networks as described above with respect to FIG. 2. Computing device 500, for example, may provide an operating environment for controller 105, first AP 115, second AP 120, third AP 125, first client device 130, second client device 135, or third client device 140. Controller 105, first AP 115, second AP 120, third AP 125, first client device 130, second client device 135, or third client device 140 may operate in other environments and are not limited to computing device 500.

Computing device 500 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples, and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   causing a primary Access Point (AP) and a subordinate AP to use an omnidirectional antenna pattern during a synchronization period;
   causing the primary AP and the subordinate AP to use the omnidirectional antenna pattern during a time in which the primary AP sends a first subordinate Trigger Frame (TF) during a first Coordinated Orthogonal Frequency Division Multiple Access (C-OFDMA) period;
   causing the primary AP and the subordinate AP to use a directional antenna pattern during times in which the primary AP and the subordinate AP receive Uplink (UL) data during the first C-OFDMA period and send Downlink (DL) data during the first C-OFDMA period; and
   switching back, by the primary AP and the subordinate AP, to the omnidirectional antenna pattern when the primary AP sends a second subordinate TF.

2. The method of claim 1, wherein a beacon frame is sent by the primary AP during the synchronization period.

3. The method of claim 2, wherein the beacon frame contains Timing Synchronization Function (TSF) information for clock synchronization for the subordinate AP.

4. The method of claim 2, wherein the beacon frame contains information about the first C-OFDMA period, which is upcoming.

5. The method of claim 4, wherein the information about the first C-OFDMA period comprises information about when the C-OFDMA period will occur.

6. The method of claim 4, wherein the information about the first C-OFDMA period comprises information about how long the first C-OFDMA period will last.

7. The method of claim 2, wherein the beacon frame contains information indicating that a second C-OFDMA period is upcoming.

8. A system comprising:
   a memory storage; and
   a processing unit coupled to the memory storage, wherein the processing unit is operative to:
      cause a primary Access Point (AP) and a subordinate AP to use an omnidirectional antenna pattern during a synchronization period;
      cause the primary AP and the subordinate AP to use the omnidirectional antenna pattern during a time in which the primary AP sends a subordinate Trigger Frame (TF) during a first Coordinated Orthogonal Frequency Division Multiple Access (C-OFDMA) period;
      cause the primary AP and the subordinate AP to use a directional antenna pattern during times in which the primary AP and the subordinate AP receive Uplink (UL) data during the first C-OFDMA period and send Downlink (DL) data data during the first C-OFDMA period; and
      switch back, by the primary AP and the subordinate AP, to the omnidirectional antenna pattern when the primary AP sends a second subordinate TF.

9. The system of claim 8, wherein a beacon frame is sent by the primary AP during the synchronization period.

10. The system of claim 9, wherein the beacon frame contains Timing Synchronization Function (TSF) information for clock synchronization for the subordinate AP.

11. The system of claim 9, wherein the beacon frame contains information about the first C-OFDMA period, which is upcoming.

12. The system of claim 11, wherein the information about the first C-OFDMA period comprises information about when the C-OFDMA period will occur.

13. The system of claim 11, wherein the information about the first C-OFDMA period comprises information about how long the first C-OFDMA period will last.

14. A non-transitory computer-readable medium that stores a set of instructions which when executed by a processor perform a method executed by the set of instructions comprising:
   causing a primary Access Point (AP) and a subordinate AP to use an omnidirectional antenna pattern during a synchronization period;
   causing the primary AP and the subordinate AP to use the omnidirectional antenna pattern during a time in which the primary AP sends a subordinate Trigger Frame (TF) during a first Coordinated Orthogonal Frequency Division Multiple Access (C-OFDMA) period;
   causing the primary AP and the subordinate AP to use a directional antenna pattern during times in which the primary AP and the subordinate AP receive Uplink (UL) data during the first C-OFDMA period and send Downlink (DL) data during the first C-OFDMA period; and switching back, by the primary AP and the subordinate AP, to the omnidirectional antenna pattern when the primary AP sends a second subordinate TF.

15. The non-transitory computer-readable medium of claim 14, wherein a beacon frame is sent by the primary AP during the synchronization period.

16. The non-transitory computer-readable medium of claim 15, wherein the beacon frame contains Timing Synchronization Function (TSF) information for clock synchronization for the subordinate AP.

17. The non-transitory computer-readable medium of claim 15, wherein the beacon frame contains information about the first C-OFDMA period, which is upcoming.

18. The non-transitory computer-readable medium of claim 17, wherein the information about the first C-OFDMA period comprises information about when the C-OFDMA period will occur.

19. The non-transitory computer-readable medium of claim 17, wherein the information about the first C-OFDMA period comprises information about how long the first C-OFDMA period will last.

20. The non-transitory computer-readable medium of claim 15, wherein the beacon frame contains information indicating that a second C-OFDMA period is upcoming.

* * * * *